United States Patent

[11] 3,611,280

[72] Inventor Marshall E. Sheehy
 112 West Scott St., Grand Ledge, Mich. 48837
[21] Appl. No. 739,601
[22] Filed May 10, 1968
[23] Division of Ser. No. 392,166, Aug. 26, 1964
[45] Patented Oct. 5, 1971

[54] DETECTION MEANS
 4 Claims, 5 Drawing Figs.
[52] U.S. Cl. .................................................. 340/16 R, 340/17
[51] Int. Cl. .................................................. G08b 13/00
[50] Field of Search ........................................ 340/7, 8–15, 17, 16

[56] References Cited
 UNITED STATES PATENTS
 1,640,538  8/1927  DuBois-Reymond ........ 340/8

Primary Examiner—Richard A. Farley
Attorney—Mildred K. Flowers

ABSTRACT: A sonic detector for sensing substantially horizontally moving sonic waves comprising a sectional housing having a transducer means carried therein. One section of the housing is provided with an outwardly extending radial flange for intercepting the horizontal sonic waves and transmitting sliding movement to the section with respect to the other housing section. The sliding movement of the said housing section provides activation of the transducer means for producing a signal.

This invention relates to improvements in detection methods and means and, more particularly, but not by way of limitation, to a system and means for detecting unwanted personnel or intruders encroaching upon an area surrounding and at a distance from a given site.

PATENTED OCT 5 1971

3,611,280

INVENTOR.
Marshall E. Sheehy
BY
Mildred K. Flowers
AGENT

DETECTION MEANS

This application is a division of my copending application Ser. No. 392,166, filed Aug. 26, 1964.

There are many instances wherein it is desirable to be provided with a warning of impending danger due to the approach of unwanted or unauthorized personnel in a direction toward a given location or site. For example, in warfare situations, it is highly desirable to receive advance signals of the approach of enemy personnel, particularly guerrilla fighters and the like, to preclude the imminent dangers from surprise attacks. Of course, at the present time, patrol groups are utilized for scouting the surrounding area in an effort to determine the location of any enemy personnel in the vicinity, but the detection of guerrilla fighters, and other hidden persons, is very difficult, and even of peril to the actual patrol groups engaged in the scouting operation. In addition, the nature of the terrain in battle areas frequently increases the difficulty of detection of the enemy by scouting personnel, such as in jungle areas and the like, wherein visual detection methods are greatly reduced in efficiency.

The present invention contemplates a novel detection method and means wherein sonic means is utilized for detecting the presence of approaching personnel, whether walking persons or persons approaching in vehicles or the like, in an area or at a position remote from the central station or site being protected. The sonic means energizes a signaling means upon the detection of approaching personnel and provides an indication of the general area wherein the enemy may be found, thus substantially eliminating the surprise nature of the enemy attack. In addition, it is possible to locate the approximate position of the approaching foe in a manner wherein means may be utilized for elimination of the enemy prior to any possible sneak attack on the site being protected. The novel method comprises the placement of a plurality of spaced sonic detector members particularly designed and constructed for being activated by substantially horizontally moving sound waves in the earth. The utilization of a horizontally actuated sonic detector has many advantages in that many disturbances caused by nature may be substantially eliminated in the detection system. For example, falling rain which may strike the earth directly above a detector will have little or no effect thereon, thus greatly reducing false signals and the like in the overall detection system. Activation of any one of the sonic detectors immediately energizes a signal lamp or the like provided in the central area or site being protected. Each of the detectors is in electrical connection with an individual signal means in order that the location of the particular sonic detector which has been activated may be readily determined. The direction of travel of the approaching unknown person may be ascertained by the sequence in which additional sonic detectors are activated. The sonic detectors are carried by a common cable, and may be quickly and easily distributed throughout a line of travel or along a path wherein the detection of approaching personnel is desired. In addition, the detectors are connected with the signal means in a manner whereby any break in the common cable will not disturb the operation of the remaining detectors disposed between the break and the signal or indicating means. This not only provides a more efficient detection system in actual warfare conditions, but also provides a ready determination of the general position or location of the break for facilitating repairing of the system in a minimum of time.

It is an important object of this invention to provide a novel detection system and means wherein the presence of unknown persons at remote positions may be signalled to a site being protected.

It is another object of this invention to provide a novel detection method and means wherein the presence of unknown persons may be signalled to a site being protected in order to provide advance information as to the relative position of the person.

Another object of this invention is to provide a novel detection method and means wherein substantially horizontally travelling sonic waves are detected for transmitting a signal to a central position for greatly reducing false signals in the system.

Still another object of this invention is to provide a novel portable detection system and means for signalling the presence of unauthorized persons or the like, which may be quickly and easily installed on one site or removed therefrom for installation in another location.

A further object of this invention is to provide a novel detection system and means so arranged to permit operation of at least a portion of the system in the event of a break in the connecting cable utilized therein.

A still further object of this invention is to provide a novel detection system and means which is simple and efficient in operation and economical and durable in construction.

Other and further objects and advantageous features of the present invention will hereinafter more fully appear in connection with a detailed description of the drawings in which.

Figure 1:
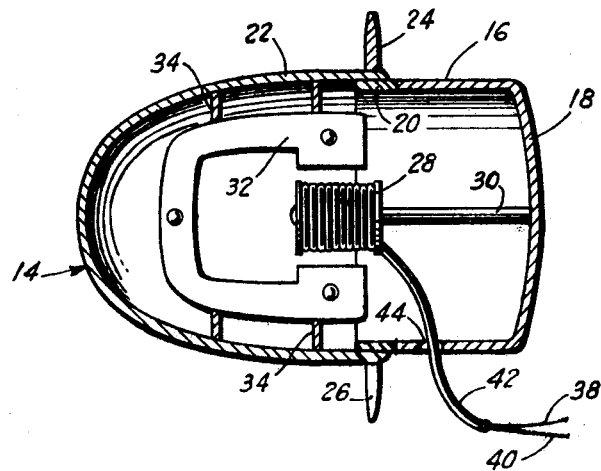
FIG. 1 is a sectional elevational view of a sonic detector device such as utilized in the practice of the invention.
Figure 2:
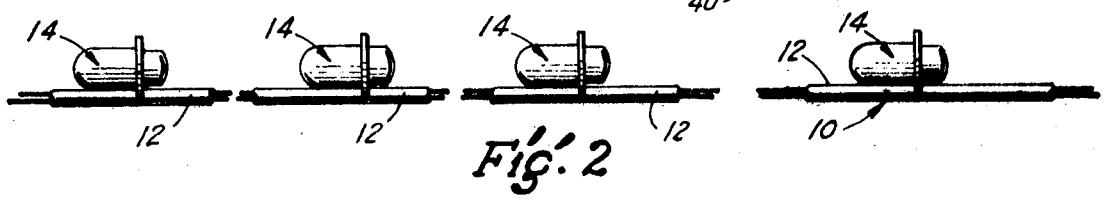
FIG. 2 is a broken side elevational view of a detection means embodying the invention.

Referring to the drawings in detail, reference character 10 generally indicates a detection means comprising a suitable cable 12 having a plurality of sonic detectors 14 spaced throughout the length thereof and secured to the outer periphery thereof in any well-known manner (not shown), such as by windings of pressure-sensitive friction tape, or the like, but not limited thereto. The sonic detectors 14 may be of any suitable type, but are preferably transducers which are actuated by substantially horizontally travelling sound waves. As particularly shown in FIGURE 1, the sonic detector 14 may comprise a housing 16 having one end 18 thereof closed and the opposite end thereof open for a purpose as will be hereinafter set forth. A cylindrical ring 20 is provided at the open end of the housing 16 and is preferably constructed of any suitable lubricated material, such as an oilite bronze, or plastic material, or the like, but not limited thereto. A second housing 22 is carried by the ring 20 for closing the open end of the housing 16 and is longitudinally slidable with respect to the housing 16. The lubricated ring 20 facilitates the sliding movement of the housing 22 during operation of the detector 14 as will be hereinafter set forth. An annular ring 24 is secured around the outer periphery of the housing 22 in any well-known manner (not shown) and functions as a ground coupling ring for intercepting sonic waves and imparting the sliding movement to the housing 22. In addition, it is preferable to provide a recess or opening 26 in the ring 24 for receiving the cable 12 therein in order to facilitate securing of the detector 14 thereto.

A suitable electrical coil 28 is secured to the closed end 18 of the housing 16 by a support post 30 and extends inwardly into the proximity of a permanent magnet member 32 which is suitably secured within the housing 22 in any well-known manner, such as by a plurality of spaced, insulated support members 34. The coil 28 is electrically connected with an amplifier 36 by means of a pair of conductors 38 and 40, one of which may be grounded at the amplifier, and the other of which is connected through the amplifier 36 for energizing an individual signal lamp or the like (not shown) provided in he indicator device generally indicated at 38. Of course, the indicator 38 is electrically connected with the amplifier 36 in any well-known manner and may be of any suitable type wherein an independent signal member is provided for each transducer or sonic detector 14 spaced along the cable 12. The conductors or leads 38 and 40 may be encased in a suitable tubing 42, if desired, which extends from the coil 28 through an aperture 44 provided in the housing 16 and into the cable 12 wherein the leads 38 and 40 extend longitudinally through the cable 12 into connection with the amplifier 36.

When the transducer 14 is in operation, the ground coupling ring 24 intercepts sonic waves travelling in a substantially horizontal direction, and the impinging of the waves against the ring 24 causes the ring to be horizontally displaced, whereby the housing 22 is reciprocated with respect to the housing 16. Movement of the housing 22 is transmitted to the magnet 32 by means of the support members 34, thus moving the magnet 32 with respect to the coil 28. This activates the coil 28, as is well known in transducer devices, for sending a signal through the conductors 38 and 40 to the amplifier 36 and indicator device 38. Whereas the housing 22 as depicted herein is movable with respect to the housing 16, it is to be noted that the ring 24 could be secured to the outer periphery of the housing 16 instead of the housing 22 for moving the housing 16 with respect to the housing 22. This would cause the coil 28 to move with respect to the magnet 32, causing the same results as hereinbefore set forth for sending a signal to the amplifier and indicating means. In addition, it is to be noted that a carbon button arrangement or the like could be utilized in lieu of the coil 28 in the transducer device 14, and there is no intent to limit the invention to use of a coil.

Figure 5:
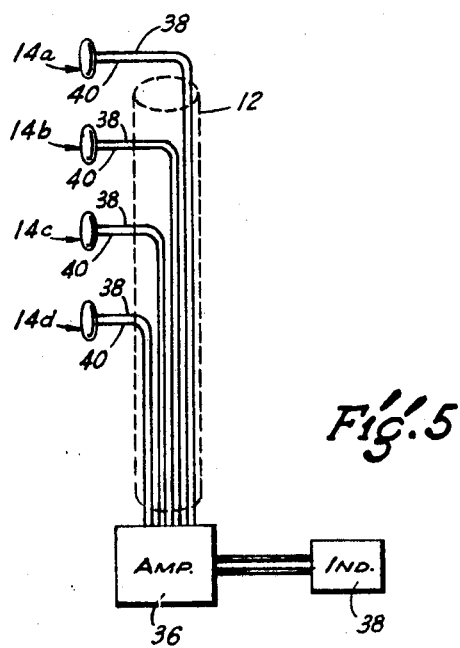
FIG. 5 is a schematic view of a detecting system embodying the invention.

As hereinbefore set forth, each transducer or sonic detector 14 is directly connected with the amplifier 36 through the respective leads 38 and 40, as particularly shown in FIG. 5. By way of example, the leads 38 and 40 of the transducer 14a disposed at the greatest distance from the amplifier 36 extend substantially throughout the entire length of the cable 12, whereas the leads 38 and 40 of the next-succeeding transducer 14b extend through the cable 12 only from the transducer 14b to the amplifier. Similarly, the leads 38 and 40 of the transducer 14d extend through the cable 12 only from the transducer 14d to the amplifier 36. In this manner, any break occurring in the cable 12 will result in inoperativeness of only those transducers 14 disposed therebeyond whereas those transducers 14 disposed between the break and the amplifier will still be operative.

OPERATION

Figure 4:
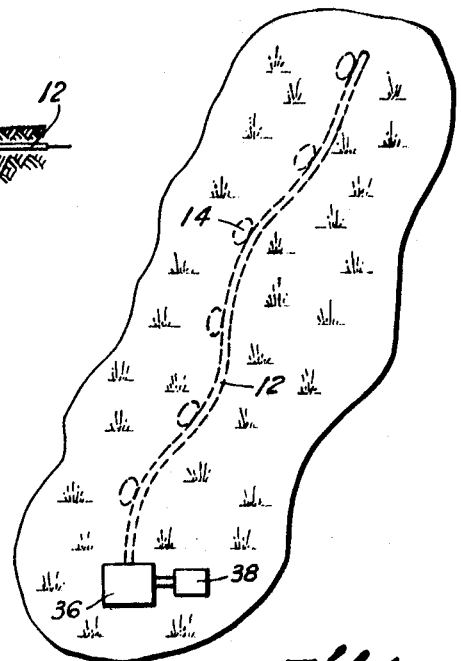
FIG. 4 is a plan view depicting a detecting means embodying the invention.

When it is desired to provide advance information of the approach of unauthorized or unwanted personnel or the like in the vicinity or in a direction toward an area being protected, the detecting apparatus 10 may be quickly and easily installed in the general area for transmitting a signal to a central location. As shown in FIG. 4, the amplifier 36 and indicating means 38 may be disposed at the central location or site, and the cable 12 having a plurality of the transducers 14 spaced therealong may be extended along the path or throughout the area under surveillance. As clearly shown in the drawing, the cable may be disposed through substantially any desired contours for placing the transducers at the optimum positions for the surveillance operation.

Figure 3:
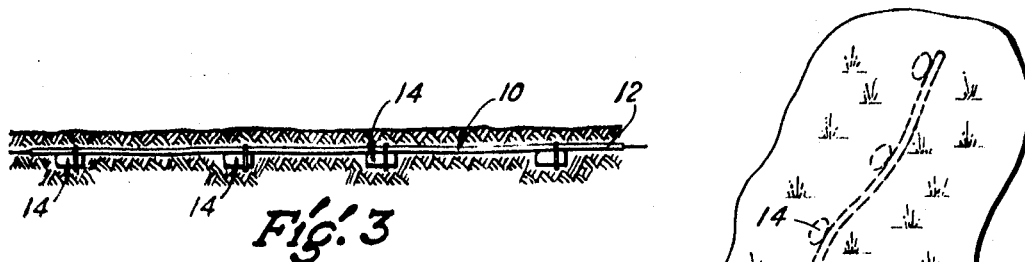
FIG. 3 is a sectional elevational view depicting the detecting means buried in the ground.

The cable 12 may be loosely wound on a suitable reel (not shown), if desired, and an installing party of two men may be utilized for quickly unreeling the cable for disposing the transducers along the path or in the area being patrolled. As a transducer 14 is disposed on the ground, at least a portion of the ring 24 must be disposed under the surface of the ground in order that the ring 24 will intercept the desired sonic waves. If there is sufficient time, the entire cable 12 and all of the transducers 14 carried thereby may be completely buried beneath the ground as particularly shown in FIG. 3. However, when speed of installation is of great importance, it may be necessary to embed only a portion of the ring 24, and perhaps a portion of the transducer 14 in the proximity of the ring 24. This may be accomplished by placing the transducer on the surface of the ground and exerting a downward force or pressure thereon in any suitable manner, such as by stepping on the outer periphery of the transducer, whereby the ring 24 will be forced into the earth. In addition, it is considered desirable to cover the portion of the cable 12 disposed above the ground in order to reduce any possible detection of the installation of the device 10. This may be done quickly, covering the exposed portions with leaves or other natural debris present in the area.

After the device 10 has been installed, an operator may be stationed in the vicinity of the amplifier 36 and indicating device 38 in order to receive any signals transmitted thereto. When an object such as a person or a vehicle approaches the vicinity of any one of the transducers 14, sonic impulses or vibrations are set up in the earth under the person or vehicle. These sonic waves travel through the earth in a universal direction, and a portion of these waves travels in a substantially horizontal path. These horizontally travelling waves are intercepted by the ring 24 of the transducer 14 in the closest proximity to the approaching person or vehicle. As hereinbefore set forth, this will activate the respective transducer for sending a signal to the amplifier and indicating means. The particular or individual indicating means in connection with the activated transducer will immediately give an indication or alarm. Of course, the individual indicating means may be of any suitable type, such as a lamp or bulb, buzzer, bell, or the like. The observer or operator will be immediately alerted of the approach of an intruder, and will have a general location of the intruder due to the knowledge of the placement of the activated transducer. As the intruder moves through the area under surveillance, the next succeeding transducer in the line of travel will be activated, thus giving a further indication as to the location and possible direction being followed by the person.

Of course, it is preferable to space the transducers 14 along the cable 12 in such a manner as to reduce the possibility of two transducers picking up the sonic vibrations from a single intruder. However, it will be apparent that a person intruding at a point substantially equal distance between an adjacent pair of the transducers will probably be noted by both detectors. In this instance, two signals may be received at the amplifier and indicating means substantially simultaneously. However, this will provide a more accurate indication of the location of the intruder at that particular time.

In the event the intruder discovers the cable 12 and cuts or otherwise breaks the cable, only those transducers 14 disposed beyond the break will be severed from the connection with the amplifier 36 and indicator 38. Thus, if the intruder continues in a direction toward the remaining transducers, his travel will be picked up or signalled to the central location.

Of course, a plurality of the devices 10 may be utilized from a single central location with the cable 12 extending radially outwardly from the central location to provide surveillance throughout the entire surrounding area. In addition, it is to be noted that removal of the installed devices 10 may be readily accomplished by merely removing the transducers and cable from the ground and rewinding thereof onto the reel, whereupon the device 10 may be reinstalled at a new site, if desired.

Whereas the particular installations set forth herein relate primarily to terrain under surveillance in a warfare operation, it is to be noted that the system and means may be utilized under substantially any conditions wherein it is desired to provide an advance signal upon the intrusion of unwanted or unauthorized personnel, such as in the vicinity of a highly secret military installation or the surrounding grounds of a residence or place of business or the like.

From the foregoing it will be apparent that the present invention provides a novel method and means for detecting the presence or approach of a person or persons unknown. The cable having a plurality of transducers spaced therealong may be quickly and easily installed throughout an area to be surveyed, and the individual signal provided by each of the spaced transducers facilitates the determination of the location of the intruder. In the event the cable is cut or otherwise broken, the entire apparatus is not made inoperative, thus increasing the overall efficiency and usefulness of the device. The novel method and means is simple and efficient in operation and economical and durable in construction.

Changes may be made in the combination and arrangement of parts as heretofore set forth in the specification and shown in the drawings, it being understood that any modification in the precise embodiment of the invention may be made within the scope of the following claims, without departing from the spirit of the invention.

What is claimed is:

1. A sonic detector comprising a first housing, a second housing slidably secured to the first housing, transducer means carried by the two housings, means provided on the second housing for intercepting substantially horizontally moving sonic waves for transmitting sliding movement to the second housing, said sliding movement of the said second housing providing activation of the transducer means for producing a signal.

2. A sonic detector comprising a first housing, a second housing slidably secured to the first housing, means cooperating between the two housings for facilitating relative movement therebetween, coil means carried by the first housing, magnet means carried by the second housing and cooperating will the coil means to provide a transducer, means provided on the second housing for intercepting substantially horizontally moving sonic waves for transmitting sliding movement to the second housing with respect to the first housing, and said relative movement between the two housings providing relative movement between the magnet means and the coil means whereby a signal is produced by the transducer.

3. A sonic detector comprising a first housing, a second housing slidably secured to the first housing, lubricating means cooperating between the two housings for facilitating relative movement therebetween, coil means carried by the first housing and disposed internally thereof, magnet means carried by the second housing and disposed internally thereof for cooperating with the coil means to provide a transducer, a radially outwardly extending flange provided on the outer periphery of the second housing for intercepting substantially horizontally moving sonic waves for transmitting sliding movement to the second housing with respect to the first housing, and said relative movement between the two housings providing relative movement between the magnet means and the coil means whereby a signal is produced by the transducer.

4. A sonic detector comprising a first housing, a second housing slidably secured to the first housing, means cooperating between the two housing for facilitating relative movement therebetween, coil means carried by one of said housings, magnet means carried by the other of said housings and cooperating with the coil means to provide a transducer, means provided on the second housing for intercepting substantially horizontally moving sonic waves for transmitting sliding movement to the second housing with respect to the first housing, and said relative movement between the two housings providing relative movement between the magnet means and the coil means whereby a signal is produced by the transducer.